United States Patent [19]

Pavlin

[11] Patent Number: 5,777,023
[45] Date of Patent: Jul. 7, 1998

[54] DIAMIDEDIURETHANES AND HOT-MELT PRINTING THEREWITH

[75] Inventor: Mark S. Pavlin. Lawrenceville, N.J.

[73] Assignee: Union Camp Corporation. Wayne, N.J.

[21] Appl. No.: 723,590

[22] Filed: Oct. 1, 1996

[51] Int. Cl.$^6$ .................... C08L 75/12; C08G 18/32
[52] U.S. Cl. .................. 524/590; 528/44; 528/74.5; 528/84; 528/85; 106/31.29; 106/31.61
[58] Field of Search .................. 528/44, 74.5, 84, 528/85; 524/590; 106/31.29, 31.61

[56] References Cited

U.S. PATENT DOCUMENTS

| | | | |
|---|---|---|---|
| 2,983,693 | 5/1961 | Sievers | 528/74.5 |
| 4,157,266 | 6/1979 | Hauxwell et al. | 106/308 |
| 4,742,112 | 5/1988 | Brauer et al. | 528/74.5 |
| 5,286,288 | 2/1994 | Tobias et al. | 106/20 |
| 5,312,889 | 5/1994 | Frische et al. | 528/74.5 |
| 5,387,658 | 2/1995 | Schröder et al. | 525/530 |

FOREIGN PATENT DOCUMENTS

| | | |
|---|---|---|
| 2350454 | 4/1974 | Germany. |
| WO 94/14902 | 7/1994 | WIPO. |

*Primary Examiner*—Tae Yoon
*Attorney, Agent, or Firm*—Seed and Berry LLP

[57] ABSTRACT

Solid compositions containing diamidediurethanes are useful as components of hot-melt inks. Diamidiurethanes may be prepared by reaction of a hydroxycarboxylic acid and/or lactone with either (1) monoamine and diisocyanate or (2) diamine and monoisocyanate. Alternatively, the diamidediurethane may be prepared by reacting a non-hydric carboxylic acid and/or anhydride with an hydroxyamine and a diisocyanate. The reactant identity and stoichiometry, as well as the reaction conditions, may be tailored to optimize the formation of diamidediurethane in preference to high molecular weight oligomers. The hot-melt inks may be used in ink jet, flexographic, gravure and intaglio printing.

41 Claims, No Drawings

5,777,023

DIAMIDEDIURETHANES AND HOT-MELT PRINTING THEREWITH

TECHNICAL FIELD

The present invention relates to hot-melt inks and components thereof having amide and urethane moieties, as well as methods for printing with such inks.

BACKGROUND OF THE INVENTION

Hot-melt inks are characterized by being solid at room temperature and molten at an elevated temperature at which the hot-melt ink is applied to a substrate. Hot-melt inks are widely used in ink jet printing, and have also been suggested for use in flexographic, intaglio and gravure printing.

Ink jet printing is a well-known process for the non-contact printing of substrates such as paper, plastic films, metal foils and the like. In essence, ink jet printing ejects a stream of liquid ink through a very small orifice, and thereafter, at a certain distance from the orifice known as the breakup distance, the stream separates into minute uniformly-sized droplets. The ink droplets travel through the air until they hit a substrate, whereupon the ink forms an image on the substrate.

Various technologies have been developed to direct jet ink in an image-wise fashion from the printhead of a printing device to a substrate. In one technology, called drop-on-demand, the printhead passes over a substrate and ejects droplets of ink only when and where ink is desirably deposited on the substrate. Drop-on-demand technology is commonly employed in desktop ink jet printers.

In contrast, in a process known as continuous stream jet printing, the printhead is constantly ejecting ink droplets as it passes over a substrate, or as the substrate passes before the printhead. A guidance system is stationed between the printhead and the substrate, so ink droplets are directed either to a specific location on the substrate or to a recirculation gutter if the droplets being ejected should not be allowed to contact the substrate. A typical continuous stream ink jet printer employs inks that can be given an electric charge, and the guidance system is an electrostatic field that will interact with and direct the charged ink droplets to a desired location. Continuous stream jet ink printing is more commonly seen in industrial printing than in desk top printing.

Jet inks suitable for either drop-on-demand or continuous stream ink jet printing can be classified either as liquid jet inks or hot-melt jet inks. Either type of ink typically contains both colorant and carrier, where the carrier is a material that dissolves or suspends the colorant. A liquid jet ink is liquid at room temperature, and is typically at about room temperature while being stored in a printhead prior to being ejected. A simple liquid jet ink is composed of an aqueous carrier and a water-soluble dye as the colorant. After a liquid jet ink contacts a substrate, the solvent typically evaporates or wicks away from the colorant, leaving the colorant visible at the site where the ink initially contacted the substrate.

In contrast, a hot-melt jet ink is solid at room temperature, and is heated to a molten state prior to being ejected from an ink jet printhead. Upon contacting the substrate, which is typically at room temperature, the molten hot-melt ink will cool and solidify. A simple hot-melt ink is composed of wax as the carrier and a pigment or dye as the colorant. All, or nearly all, of the components of a hot-melt ink remain at the site where the molten ink contacts the substrate, i.e., there is little or no wicking or evaporation of a hot-melt ink.

An ink composition useful in jet ink printing should have certain properties. It is highly desirable that the ink display a consistent breakup length, droplet viscosity, and at least in continuous stream jet printing, a constant droplet charge under the conditions employed during the jet ink printing process. To meet these requirements, the jet ink composition must have stable viscosity, stable resistance properties, and should not dry out upon aging.

A major problem with liquid jet inks arises because they contain substantial amounts of water and/or organic solvent, which evaporate upon standing so that these inks dry out and cake. This can cause blocking of the printhead orifice(s). A further problem is that loss of volatile solvents causes the inks to increase in viscosity, which will cause substantial changes in the performance of the inks. Also, a porous substrate such as paper tends to cockle and/or distort when printed with high quantities of liquid jet ink. In addition, organic solvents in a liquid jet ink can evaporate after contacting the substrate, and this may cause health problems for some persons nearby.

Another problem associated with the presence of liquid solvents in a liquid jet ink is that these solvents cause the colorant to bleed into the printed substrate, which is typically porous, with the consequence that the printing displays poor resolution. While specially coated porous substrates may overcome this problem, such special substrates are expensive and not generally necessary for other types of printing, e.g., reprographic printing, which work fine with "plain paper", i.e., standard non-coated sheet. At least in an office setting, it is highly desirable that all printing, including ink jet printing, be done on "plain paper" or standard transparencies.

Hot-melt inks offer a number of advantages over liquid inks. For example, when liquid ink is used to deposit colorant on a porous substrate, the colorant tends to be carried into the substrate as the liquid carrier wicks into the substrate. This causes a reduction in print density and some loss in print resolution. In contrast, the rapid solidification of a hot-melt ink ensures that the colorant is fixed to the surface of the substrate, with a corresponding increase in print density and resolution. A further advantage is that there is little or no cockle associated with the printing of hot-melt inks, which is in distinct contrast to printing done with liquid inks. Still another advantage is that hot-melt inks are easier to transport without spillage than liquid inks.

For several reasons, the adhesion of colorant to a substrate may also be superior in hot-melt printing. For instance, because all of the carrier in a hot-melt ink stays with the colorant at the surface of the printed substrate, rather than evaporating or wicking away from the colorant as occurs in printing with liquid inks, a hot-melt carrier is more available to assist in fixing the colorant to the substrate surface. Also, carriers which are solid at room temperature will naturally have better fixing properties than liquid carriers.

Looking specifically at jet ink printing, hot-melt inks offer the advantage of having essentially no volatile components. Thus, there is no evaporation of components in a hot-melt ink, and so no corresponding problems with changes in ink viscosity, caking and health risks due to solvent evaporation, which are seen with liquid jet inks.

To a significant extent, the properties of the carrier determine the properties of a jet ink. The prior art discloses several materials that may be used as a carrier, sometimes called a vehicle, a binder or a solid organic solvent, in hot-melt jet inks. U.S. Pat. No. 3,653,932 discloses to use diesters of sebacic acid (a solid linear $C_{10}$ dicarboxylic acid)

and paraffinic alcohols having 12 or less carbons. U.S. Pat. No. 4,390,369 discloses to use natural wax. U.S. Pat. No. 4,659,383 discloses to use $C_{20-24}$ acids or alcohols. U.S. Pat. No. 4,820,346 discloses to use aromatic sulfonamides. U.S. Pat. No. 4,830,671 discloses to use short-chain polyamides. U.S. Pat. No. 5,151,120 discloses to use the ethyl ester of stearic acid (a solid linear, $C_{18}$ carboxylic acid). U.S. Pat. No. 5,354,368 discloses to use tall oil rosin. The foregoing are exemplary of the prior art directed to hot-melt ink carriers.

Despite the significant amount of research that has been done in the area of carriers for hot-melt inks, there remains a need in the art for superior carrier materials useful in hot-melt inks, and for inks having such carrier materials.

SUMMARY OF THE INVENTION

The invention is directed to a solventless composition having an isocyanate number of essentially zero, which contains at least one diamidediurethane having the following formulas (1), (2) and (3):

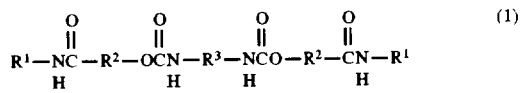

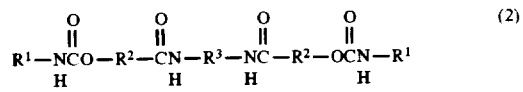

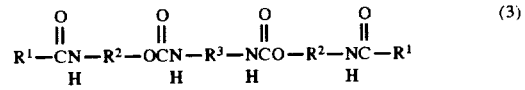

In formulas (1), (2) and (3), each of $R^1$, $R^2$ and $R^3$ is independently selected from organic moieties having the formula $C_{1-50}H_{2-102}O_{0-15}$. The identity of $R^1$, $R^2$ and $R^3$ is preferably selected so that the composition has a melting point and melt viscosity rendering it suitable as a component of a hot-melt ink. Thus, for use with presently available printing equipment, the composition has a melting point of about 40° C. to about 150° C. and a melt viscosity measured at 150° C. of less than about 300 centipoise.

Another aspect of the invention is an ink which contains the above-described composition and an image-forming component. The image-forming component is preferably a pigment, dye or other substance which can be seen by the human eye. For use with currently available printing equipment, for example a hot-melt ink jet printer, the ink preferably has a very low viscosity, such as less than about 50 cP at a temperature of about 75° C. to about 175° C.

A further aspect of the invention is a method for preparing the above-described composition that contains diamidediurethane. The method includes at least two steps, where the first step prepares a hydroxyamide compound. The hydroxyamide compound has either one each of hydroxyl and amide moieties or two each of hydroxyl and amide moieties, i.e., the hydroxyamide compound has either a single hydroxyl moiety and a single amide moiety, or else has exactly two hydroxyl moieties and exactly two amide moieties. In the second step, the hydroxyamide compound is reacted with an isocyanate-containing compound to form diamidediurethane.

The hydroxyamide compound is formed by reacting the carbonyl moiety of a carbonyl compound with the amine moiety of an amine compound. The carbonyl compound has either one carboxylic acid moiety, one anhydride moiety, one lactone moiety, or one hydroxyl moiety and one carboxylic acid moiety, as the only reactive moieties. The amine compound has either a single amine moiety (monoamine), two amine moieties (diamine) or one hydroxyl moiety and one amine moiety (hydroxyamine) as the only reactive moieties. This reaction is preferably carried out so that amidification (reaction between a carbonyl moiety and an amine moiety to form an amide moiety) is favored over esterification (reaction between a carbonyl moiety and an hydroxyl moiety to form an ester moiety), to thereby form hydroxyamide compound (compound having both amide and hydroxyl moieties) in high yield.

The second step reacts the hydroxyl moiety(s) of the hydroxyamide compound with the isocyanate moiety(s) of an isocyanate compound. The isocyanate compound has either one isocyanate moiety (monoisocyanate) or two isocyanate moieties (diisocyanate) as the only reactive moieties. By this procedure, a diamidediurethane is formed in a composition having an isocyanate number of essentially zero. The reaction is preferably conducted under conditions that favor the reaction between the hydroxyl moiety(s) of the hydroxyamide compound and the isocyanate moiety(s) of the isocyanate compound. The reaction stoichiometry is preferably selected in order that the resulting product mixture has an isocyanate number of essentially zero, i.e., essentially all of the isocyanate moieties react. In addition, as the product composition is primarily intended for use in hot-melt printing, where solvents are preferably not employed, the composition containing diamidediurethane preferably does not contain any volatile solvent, and so the reaction to form diamidediurethane is preferably conducted in the absence of solvent.

Yet another aspect of the invention is a method of printing. The method includes the step of applying a molten composition containing diamidediurethane and an image forming component to a substrate, wherein the diamidediurethane has at least one of the formulas (1), (2) and (3):

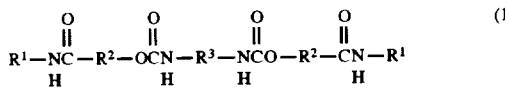

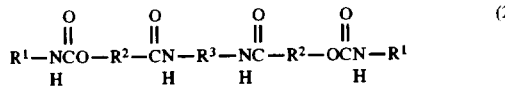

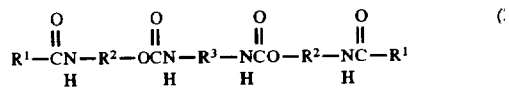

wherein each of $R^1$, $R^2$ and $R^3$ is independently selected from organic moieties having the formula $C_{1-50}H_{2-102}O_{0-15}$ such that said composition has a melting point of about 40° C. to about 150° C. and a melt viscosity measured at 150° C. of less than about 300 centipoise.

A still further aspect of the invention is a method of printing wherein (a) an image-forming component is mixed with a composition containing a diamidediurethane to thereby prepare a hot-melt ink, (b) the hot-melt ink is melted to thereby prepare molten ink, (c) the molten ink is contacted with a flexographic, gravure or intaglio printing plate to provide a printing plate having molten ink thereon (in the case of flexographic printing, the ink is transferred to an anilox cylinder before being contacted with the flexograph printing plate), (d) the printing plate having molten ink thereon is contacted with a substrate to transfer an image from the printing plate to the substrate. The composition containing a diamidediurethane contains at least one diamidediurethane of formulas (1), (2) and (3):

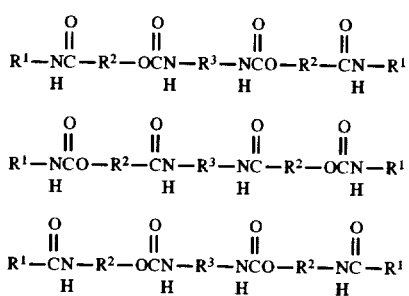

wherein each of $R^1$, $R^2$ and $R^3$ is independently selected from the group of organic moieties having the formula $C_{1-50}H_{2-102}O_{0-15}$.

DETAILED DESCRIPTION OF THE INVENTION

The invention is directed to a solventless composition that contains diamidediurethane, where the composition is useful as a carrier in a hot-melt ink, and particularly hot-melt ink for ink jet, flexographic, gravure and intaglio printing. The diamidediurethane composition contains diamidediurethane, and may (but need not) contain additional components, such as byproducts of the reaction(s) used to synthesize the diamidediurethane. Thus, the diamidediurethane composition may consist entirely of diamidediurethane, although typically there are some reaction byproducts present in the composition. The diamidediurethane of the invention contains two amide moieties and two urethane moieties, and has one of the following formulas (1), (2) or (3):

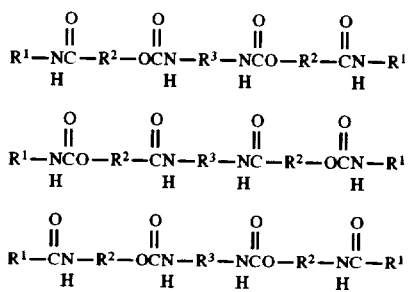

The radical $R^1$, and the diradicals $R^2$ and $R^3$ in formulas (1), (2) and (3) are organic moieties having from one to about fifty carbon atoms, optionally containing one to about fifteen oxygen atoms, and containing hydrogen atoms at otherwise unfilled valencies of the carbon and oxygen atoms. In other words, each of $R^1$, $R^2$ and $R^3$ has the formula $C_{1-50}H_{2-102}O_{0-15}$. The precise identities of $R^1$, $R^2$ and $R^3$ are preferably selected in order that the diamidediurethane composition has a melting point, melt viscosity and other properties rendering it suitable for use in a hot-melt ink.

In order to be useful in a hot-melt ink, the diamidediurethane composition should typically be a solid at room temperature and have a melting point below the operating temperature of the printing equipment which is used to apply the molten ink (prepared from the diamidediurethane composition) to a substrate. When the diamidediurethane composition is used in jet ink printing with conventional printing equipment, the composition typically has a melting point of from about 40° C. to about 150° C., preferably about 60° C. to about 140° C., and more preferably about 80° C. to about 130° C. The melting point can be measured by, e.g., the dropping point device sold by Mettler Instruments Corporation as their Model FP83HT Dropping Point Cell. The choice of $R^1$, $R^2$ and $R^3$ will influence the melting point of the diamidediurethane composition.

When molten, the diamidediurethane composition preferably has a viscosity, commonly termed a "melt viscosity", which is suitable for a component of a hot-melt ink. Again, the melt viscosity of the diamidediurethane composition can be varied by proper selection of the identities of $R^1$, $R^2$ and $R^3$. For incorporation into a jet ink being applied by conventional equipment, the diamidediurethane composition should typically have a melt viscosity of less than about 300 centipoise (cP) at 150° C., and preferably has a melt viscosity of less than about 100 cP at 130° C. Melt viscosity can be conveniently measured using the Model RVTD Digital Viscometer from Brookfield Engineering Laboratories, Inc.

Hot-melt inks are preferably non-tacky at room temperature or even slightly elevated temperatures as might be experienced when printed materials are transported in hot weather by truck or rail. Thus, the diamidediurethane composition is preferably non-tacky under the same conditions. Non-tacky diamidediurethane compositions can be prepared according to the invention disclosed herein. Another preferred feature of the diamidediurethane composition is that it is colorless. However, black hot-melt inks are commercially desirable, so colored diamidediurethane compositions, e.g., amber or hazy compositions, are also useful. Furthermore, preferred diamidediurethane compositions are hard and are not oily.

Diamidediurethane compositions having the above-delineated properties may be prepared by proper selection of $R^1$, $R^2$ and $R^3$. Some trial and error may be necessary in order to arrive at the proper selection of $R^1$, $R^2$ and $R^3$ for a particular hot-melt ink and particular printing application, however this experimentation is merely routine, and may be conducted with the following in mind.

It is generally the case that the melting point of the diamidediurethane composition increases as the carbon number, linearity and saturation of $R^1$ (which may be referred to herein as the $R^1$ group or $R^1$ moiety) increases, at least up to a certain point. Thus, $R^1$ preferably has from 6 to 36 carbons and more preferably has from 8 to 22 carbons, and is a hydrocarbon, i.e., consists exclusively of carbon and hydrogen. As the carbon number of $R^1$ increases beyond about 18 carbon atoms, at least for linear and saturated $R^1$ moieties, there is little change in the melting point or melt viscosity of the diamidediurethane composition. The $R^1$ moiety is preferably linear, as branching in the carbon chain of the $R^1$ moiety can cause a precipitous drop in the melting point of the diamidediurethane composition. In addition, linear $R^1$ moieties are preferably saturated, as unsaturation generally causes an undesirable decrease in the melting point of the diamidediurethane composition, and can also introduce cites at which the diamidediurethane can undergo oxidation upon exposure to oxygen at elevated temperature. Oxidation of the diamidediurethane is generally undesirable, because such oxidation causes changes in melt viscosity.

$R^2$ is preferably a saturated hydrocarbon moiety. However, as explained in detail below, for ease of preparing a diamidediurethane composition having a high concentration of diamidediurethane of formula (1) or (2), it is preferred that $R^2$ be a linear hydrocarbon having a bond to an oxygen atom at other than a terminus of the linear hydrocarbon chain $R^2$. Reference to formulas (1) and (2) shows that $R^2$ is bonded to both the oxygen atom of a urethane moiety and the carbon atom of an amide moiety. Preferred $R^2$ moieties have a carbon atom that is simultaneously bonded to the oxygen atom of the urethane moiety as well as to two other carbon atoms. While $R^2$ may generally contain up to about 50 carbon atoms, preferred $R^2$ groups have 2 to about 36 carbon atoms. It is generally observed that, at least up to a point, a long-chain $R^2$ moiety provides a good balance of properties to a diamidediurethane composition, and thus $R^2$ preferably contains about 2–24 carbon atoms.

The $R^3$ moiety links either two urethane moieties (see formulas (1) and (3)) or two amide moieties (see formula (2)). A preferred class of $R^3$ moieties are hydrocarbon diradicals, preferably saturated or lightly unsaturated hydrocarbon diradicals that are not readily susceptible to oxidation by oxygen. Preferred hydrocarbon $R^3$ diradicals have from 2 to about 36 carbon atoms, and more preferably have from 2 to about 24 carbon atoms. As described below, the diamidediurethane composition may optionally contain $R^3$ moieties having ether linkages.

To be suitable for use in hot-melt ink, the composition comprising the diamidediurethane should contain essentially no solvent, i.e., it should be solventless. In other words, the composition should contain no volatile material, where volatile material/solvent in this context has a boiling point of less than about 150° C. Thus, the composition of the invention is essentially free of solvent, where solvents have boiling points of less than about 150° C. This is preferred in order that the composition remain stable while molten. If there are low-boiling components in the composition, which boil away when the composition is molten, then the melt viscosity of the composition will change over time and with repeated heating and cooling cycles. Instability of melt viscosity is undesirable for a component of an ink for hot-melt printing.

In addition, the composition should not be too hygroscopic, and thus should have minimal functionality which is reactive with, or tends to absorb, water. Therefore, the diamidediurethane composition should have an isocyanate number of essentially zero. In addition, the acid number of the composition should be low, preferably less than about 20 and more preferably less than about 10.

The diamidediurethane composition of the invention may contain components in addition to the diamidediurethanes of formulas (1), (2) and (3). For example, the composition may contain oligomeric material having amide, ester and/or urethane moieties. The molecular weight of such oligomeric material is preferably low, in order that the composition have the melting point, melt viscosity and other properties rendering it suitable for use in hot-melt inks. Thus, high molecular weight polyurethanes, polyamides and polymers containing at least two of urethane, amide and ester moieties are preferably not present in the composition, to the extent that they render the composition unsuitable for use as a component of a hot-melt ink. The diamidediurethane preferably contains less than 100 carbon atoms.

Another aspect of the invention is a hot-melt ink composition. As used herein, the term "hot-melt ink" denotes an ink that is a solid at room temperature and a liquid at the operating temperature of the printer or device employing the hot-melt ink in a printing operation. Typical printers for hot-melt inks heat the ink to about 110° C. to about 130° C. The hot-melt ink of the invention has a viscosity of less than about 50 cP at a temperature of about 75° C. to about 175° C., more preferably has a viscosity of about 1 cP to about 40 cP at a temperature of about 100° C. to about 150° C., and still more preferably has a viscosity of about 5 cP to about 15 cP at a temperature of about 110° C. to about 130° C.

The hot-melt ink comprises a diamidediurethane composition as described above, in combination with an image-forming component, where the diamidediurethane composition preferably functions as the primary carrier (i.e., the major component in the carrier) for the image-forming component. The image-forming component is a material that may be visually observed or otherwise detected by any means. A colorant is a preferred image-forming component, where colorants may be visually detected by the human eye, or by an optical character reading (OCR) device. Both dyes and pigments are suitable colorants, where extensive but non-limiting lists of specific dyes and pigments suitable for use in the hot-melt ink of the present invention are set forth in both of U.S. Pat. Nos. 5,286,288 and 5,122,187, where the disclosures of these two patents are incorporated herein in their entireties.

Alternatively, the image-forming component may be a magnetic material that can be scanned by a suitable reader, or a fluorescent material that can be detected upon exposure to specific wavelengths of light. While in rare instances the carrier itself may serve as an image-forming component, it is more typically the case that the carrier is a transparent or translucent material that functions primarily to suspend and disperse the image-forming component at elevated temperatures, and then helps to fix the image-forming component to a substrate after printing.

The diamidediurethane composition typically constitutes about 0.5–97 weight percent of the hot-melt ink composition, and preferably about 80–97 weight percent of the ink composition. The image-forming component typically constitutes about 0.1–3 weight percent, and preferably about 0.3–2 weight percent of the hot-melt ink composition.

The hot-melt ink composition of the invention may contain ingredients in addition to colorant and diamidediurethane composition. For example, when the hot-melt ink is used in continuous jet ink printing, the ink may contain an electrolyte. When containing an electrolyte, the hot-melt ink may be induced to carry a charge, and droplets of charged hot-melt ink may be directed to either a substrate for printing, or a gutter for recycling, by adjustment of an electrostatic field through which the charged ink particles must pass. A suitable electrolyte for the hot-melt ink composition of the invention is an inorganic salt, as disclosed in e.g., U.S. Pat. No. 5,286,288. When the electrolyte is an inorganic salt, an electrolyte-solvating and dissociating compound, as also disclosed in the '288 patent, is preferably present in the hot-melt ink composition.

Other ingredients that may be present in the hot-melt ink composition of the invention include, without limitation one or more of a corrosion inhibitor, biocide, plasticizer tackifier, surfactant, dispersing agent, antioxidant, rheology modifier and UV stabilizer.

Hot-melt ink compositions of the present invention may generally be prepared simply by combining the desired ingredients (e.g., carrier and colorant) to form a mixture, and heating the mixture with stirring to form a molten homogeneous composition which is the hot-melt ink composition. A temperature in the range of about 90° C. to about 150° C. is typically adequate to achieve a homogeneous compositio after a stirring time of about 5 seconds to about 10 minute: It is also possible to melt one component of the ink, e.g., th diamidediurethane composition, and then add other compo nents with stirring. When pigment is included in the hot-me ink composition, it may be necessary to grind the mixture c ingredients to effect a uniform dispersion of the pigment i the ink. Grinding may suitably be accomplished with a ba mill or an atritor, as is well-known to one of ordinary ski in the art.

The hot-melt ink of the invention may be used to print c a wide variety of substrates, which may be porous non-porous. Exemplary substrates include, without limitation, plastics, plastic laminates, glass, metal, paper, wood, etc. The ink may be used in drop-on-demand and continuous ink jet printers, where these printers are commercially available from many sources.

The hot-melt ink may also be used in flexographic, gravure and intaglio printing. To achieve such printing with a hot-melt ink, a hot-melt ink as described above is melted and the molten ink stored in a reservoir. A printing plate, which is typically warmed to a temperature of greater than, or about the same as, the melting point of the hot-melt ink, is then contacted with the pool of molten hot-melt ink or, in the case of flexographic printing, ink is transferred to a heated anilox roller and then transferred to the printing plate. In this way, molten hot-melt ink is transferred to a printing plate in essentially the same manner as liquid inks are currently transferred to a printing plate.

The printing plate, having molten hot-melt ink thereon, is then contacted with a substrate in order to transfer ink to the substrate in an image-wise fashion. The substrate, which is typically at room temperature, will immediately induce cooling of the hot-melt ink, and thereby cause the ink to become fixed to the substrate.

The diamidediurethane composition of the invention may be prepared in a two-step process. In the first step, a compound having both hydroxyl and amide moieties, (i.e., a hydroxyamide compound), is prepared. In the second step, the hydroxyamide compound is reacted with a compound having either one or two isocyanate moieties (i.e., either a monoisocyanate or a diisocyanate, respectively), to thereby form a compound having two amide and two urethane moieties (i.e., a diamidediurethane).

In preparing the hydroxyamide compound, two reactants are used. One reactant has at least one carbonyl moiety and the other reactant has at least one amine moiety, so that upon their reaction, the two reactants form a single compound (a hydroxyamide compound) having at least one amide moiety. As stated above, in addition to the amide moiety, the hydroxyamide compound contains at least one hydroxyl moiety. Therefore, either the reactant that has the carbonyl moiety, or the reactant that has the amine moiety, must additionally have a hydroxyl moiety.

Preparation of the diamidediurethane composition of the invention may therefore be achieved by reacting the carbonyl moiety of a carbonyl compound such as a carboxylic acid, lactone or anhydride, with the amine moiety of an amine compound such as a monoamine, diamine or hydroxyamine, to thereby form a hydroxyamide compound. Thereafter, the hydroxyl moiety of the hydroxyamide compound is reacted with the isocyanate moiety of an isocyanate compound such as a monoisocyanate or diisocyanate, to thereby form diamidediurethane. The composition containing the diamidediurethane preferably has an isocyanate number of essentially zero and contains no volatile solvent.

The carbonyl compound may be a carboxylic acid which has no hydroxyl moiety (i.e., a non-hydric carboxylic acid), or may be the anhydride formed therefrom. Alternatively, the carbonyl compound may be a carboxylic acid that also contains a hydroxyl moiety, or may be the lactone formed therefrom. The amine compound may contain a single amine moiety and no hydroxyl moiety, i.e., be a monoamine, or may contain two amine moieties and no hydroxyl moieties, i.e., be a diamine, or may contain a single amine moiety and a single hydroxyl moiety, i.e., be a hydroxyamine. Each of these reactants will now be described in more detail.

As used herein, the term hydroxycarboxylic acid refers to an organic molecule containing one hydroxyl (—OH) moiety and one carboxylic acid (—COOH) moiety as the only reactive moieties, and has the formula HO—$R^2$—COOH where $R^2$ is defined above. Exemplary hydroxycarboxylic acids include, without limitation, lactic acid, 2-hydroxybutyric acid, 3-hydroxybutyric acid, 4-hydroxybutyric acid, 2-hydroxyisobutyric acid, 2-hydroxy-2-methylbutyric acid, 2-hydroxy-3-methylbutyric acid, 2-hydroxyvaleric acid, 2-ethyl-2-hydroxybutyric acid, 2-hydroxycaproic acid, 2-hydroxyisocaproic acid, 10-hydroxydecanoic acid, 12-hydroxydodecanoic acid, ricinoleic acid, 12-hydroxystearic acid, salicylic acid and p-hydroxybenzoic acid. As illustrated by the exemplary hydroxycarboxylic acids listed above, the hydroxycarboxylic acid may be saturated or unsaturated. 12-Hydroxystearic acid is a preferred hydroxycarboxylic acid.

The cyclization products of hydroxycarboxylic acids, i.e., cyclic molecules containing at least one ester (—O—C(=O)—) moiety in the ring structure which are known as lactones, may be used in place of, or in combination with, the hydroxycarboxylic acid. Exemplary lactones include, without limitation, β-butyrolactone, δ-valerolactone, γ-valerolactone, γ-caprolactone, ε-caprolactone, α-methyl-γ-butyrolactone, β-methyl-γ-butyrolactone, γ-decanolactone, δ-decanolactone, γ-dodecanolactone, as well as the cyclization products of each of the hydroxycarboxylic acids set forth above. The cyclization product may be a dimer of the hydroxycarboxylic acid, e.g., may be a lactide. The hydroxycarboxylic acid and/or lactone provides the $R^2$ moiety in the diamidediurethane of formulas (1) and (2).

As used herein, the term "monoamine" refers to an organic molecule containing one primary amine moiety as the only reactive moiety. Thus, the monoamines useful in preparing the diamidediurethane compositions of the invention have the formula $R^1$—$NH_2$, wherein $R^1$ is as defined above and may be aromatic or aliphatic. Exemplary preferred monoamines include, without limitation, decylamine, dodecylamine, tetradecylamine, hexadecylamine, octadecylamine (also known as stearylamine), didecylamine and behenylamine. The monoamine thus contributes $R^1$ to the diamidediurethanes of formula (1).

As used herein, the term "monoisocyanate" refers to an organic molecule having exactly one isocyanate moiety as the only reactive moiety. The monoisocyanate has a formula $R^1$—NCO, wherein $R^1$ is as defined above and may be aromatic or aliphatic. Preferably, the monoisocyanate is linear and saturated, where exemplary preferred monoisocyanates include, without limitation, hexylisocyanate, octylisocyanate, decylisocyanate, dodecylisocyanate, tetradecylisocyanate, hexadecylisocyanate, octadecylisocyanate (also known as stearylisocyanate), didecylisocyanate and behenylisocyanate. The monoisocyanate thus contributes $R^1$ to diamidediurethanes of formula (2).

As used therein, the term "diisocyanate" refers to an organic molecule that contains exactly two isocyanate moieties as the only reactive moieties. The diisocyantes have the formula OCN—$R^3$—NCO, wherein $R^3$ is an organic diradical having from 1 to 50 carbon atoms as set forth above. Suitable diisocyanates for preparing a diamidediurethane of the invention may be aromatic or aliphatic. Suitable commercially available aromatic diisocyanates include, without limitation, 4,4'-biphenyldiisocyanate, 3,3'-dimethoxy-4,4'-biphenyldiisocyanate, 3,3'-dimethyl-4,4'-biphenyldiisocyanate, diphenylmethane-4,4'-diisocyanate (also known as 4,4'-diisocyanatediphenylmethane, MDI), naphthalene-1,5-diisocyanate, toluene diisocyanate (also known as tolylene diisocyanate, TDI) having 2,4 and 2,6 isocyanate substitution, and phenylene diisocyanate, 1,6-Hexanediisocyanate (HMDI), isophoronediisocyanate (IPDI), trimethylhexamethylene diisocyanate and tetramethylene xylene diisocyanate are exemplary commercially available aliphatic diisocyanates.

In addition, a portion of the diisocyanate may be the reaction product of a diisocyanate and a diol, where the diol is an organic molecule containing two hydroxyl moieties and has the general formula HO—$R^4$—OH, wherein $R^4$ is an organic moiety having the formula $C_{2-50}H_{4-102}O_{0-15}$. Thus, a portion of the diisocyanate may contain urethane moieties separated by hydrocarbon diradicals. In such case, the hydrocarbon diradicals which separate the urethane moieties have from 2 to about 36 carbon atoms, preferably from 6 to about 12 carbon atoms. The diisocyanate thus contributes $R^3$ to a composition containing diamidediurethane of formulas (1) and (3).

As used herein, the term "diamine" refers to an organic molecule having exactly two amine moieties as the only reactive moieties. The two amine moieties are each primary amine moieties, and the diamine can be represented by the formula $H_2N$—$R^3$—$NH_2$ wherein $R^3$ is an organic radical having 1 to 50 carbon atoms as defined above. The diamine may be aromatic or aliphatic.

Exemplary diamines which are commercially available include, without limitation, ethylenediamine (EDA), 1,2-diaminopropane, 1,3-diaminopropane, N-methylethylenediamine, 1,4-diaminobutane, 1,2-diamino-2-methylpropane, N,N-dimethylethylenediamine, N-ethylethylenediamine, N-methyl-1,3-propanediamine, 1,3-diaminopentane, 1,5-diaminopentane, 2,2-dimethyl-1,3-propanediamine, N-isopropylethylenediamine, N-propylethylenediamine, N,N-diethyethylenediamine, 1,6-hexanediamine (also known as hexamethylenediamine, HMDA), N-isopropyl- 1,3-propanediamine, 2-methyl-1,5-pentanediamine, 1,7-diaminoheptane, N,N-2,2-tetramethyl-1,3-propanediamine, 1,8-diaminooctane, 2,5-dimethyl-2,5-hexanediamine, 1,9-diaminononane, 1,10-diaminodecane, N,N-dibutylethylenediamine, 1,12-diaminododecane, 4,4'-diaminophenanthrene (all isomers, including 9,10), 4,4'-methylenebis(cyclohexylamine), 2,7-diaminofluorene, phenylene diamine (1,2; 1,3 and/or 1,4 isomers), adamantane diamine, 2,4,6-trimethyl-1,3-phenylenediamine, 1,3-cyclohexanebis(methylamine), 1,8-diamino-p-menthane, 2,3,5,6-tetramethyl- 1,4-phenylenediamine, diaminonaphthalene (all isomers, including 1,5, 1,8; and 2,3) and 4-amino-2,2,6,6-tetramethylpiperidine. Ethylenediamine is an exemplary diamine with two carbon atoms, while dimer diamine is an exemplary diamine with 36 carbon atoms.

The diamine may contain oxygen atoms in the $R^3$ diradical linking the two amine moieties. Exemplary oxygen-containing diamines are the JEFFAMINE® diamines, i.e., poly(alkyleneoxy)diamines from Texaco, Inc. (Houston, Tex.), also known as polyether diamines. Preferred oxygen-containing diamines are the JEFFAMINE® ED and D series diamines.

As used herein, the term non-hydric carboxylic acid refers to an organic molecule containing one carboxylic acid moiety (—COOH) as the only reactive moiety, and therefore not containing a hydroxyl (—OH) moiety. Non-hydric carboxylic acids have the formula $R^1$—COOH. The term "non-hydric" reinforces the fact that the carboxylic acid compound does not also contain a hydroxyl moiety. Exemplary non-hydric carboxylic acids include all of the hydroxy-carboxylic acids described above, wherein the hydroxyl moiety is replaced with a hydrogen atom. Exemplary non-hydric carboxylic acids include, without limitation, fatty acids such as decanoic acid, dodecanoic acid, myristic acid (tetradecanoic acid), palmitic acid (hexadecanoic acid), stearic acid (octadecanoic acid), behenic acid and the like.

As used herein, an anhydride of a non-hydric carboxylic acid has the formula $R^1$—C(=O)—O—C(=O)—$R^1$. Anhydrides of a non-hydric carboxylic acid, either mixed (the two $R^1$ moieties in an anhydride do not have the same structure) or symmetrical (the two $R^1$ moieties in the anhydride are identical), may be used in lieu of, or in addition to, the non-hydric carboxylic acid. For example, the anhydride which forms between acetic acid and stearic acid is a mixed non-hydric anhydride that is a suitable reactant for introducing $R^1$ into a diamidediurethane. Again, the $R^1$ moiety from the anhydride contributes the $R^1$ moiety of the diamidediurethane of formula (3).

As used herein, the term "hydroxyamine" refers to a compound having both an alcohol (in other words, a hydroxy or hydroxyl moiety, —OH) and an amine (—$NH_2$) moiety, and has the formula HO—$R^2$—$NH_2$. Exemplary hydroxyamines include, without limitation, ethanolamine (2-aminoethanol), 1-amino-2-propanol, 2-(methylamino) ethanol, 2-amino-1-butanol, 4-amino-1-butanol, 2-amino-2-methyl-1-propanol, 2-(ethylamino)ethanol, 2-amino-3-methyl-1-butanol, 2-amino-1-pentanol, 5-amino-1-pentanol, 2-(propylamino)ethanol, 2-amino-1-hexanol, 6-amino-1-hexanol, isoleucinol, leucinol and the like. The hydroxyamine contributes the $R^2$ portion of the diamidediurethane of formula (3).

In the preferred method for preparing a diamidediurethane composition of the invention, it is important to properly select the reactant identities, stoichiometry and the sequence in which the reactants are combined. If these reaction parameters are not properly selected, then the reaction product (diamidediurethane composition) may contain undesirably large amounts of oligomeric materials having amide, ester and/or urethane functionality. When diamidediurethane is in combination with too much of such oligomeric material, the composition has a melt viscosity and/or melting point that is too high to be suitable for hot-melt printing.

The reactant stoichiometry for preparing diamidediurethane of formula (1), expressed as a molar ratio of hydroxycarboxylic acid/lactone to monoamine to diisocyanate, should be about 2.5–1.5:2.5–1.5:1.5–0.5, is preferably about 2.2–1.8:2.2–1.8:1.2–0.8, is more preferably about 2.1–1.9:2.1–1.9:1.1:0.9, and is still more preferably about 2:2:1. Thus, diamidediurethane of formula (1) may be prepared by reacting about 2 moles of hydroxycarboxylic acid and/or lactone with about 2 moles of monoamine and about 1 mole of diisocyanate.

Likewise, the reactant stoichiometry for preparing diamidediurethane of formula (2), expressed as a molar ratio of hydroxycarboxylic acid/lactone to monoisocyanate to diamine, should be about 2.5–1.5:2.5–1.5:1.5–0.5, is preferably about 2.2–1.8:2.2–1.8:1.2–0.8, is more preferably about 2.1–1.9:2.1–1.9:1.1:0.9, and is still more preferably about 2:2:1. Thus, diamidediurethane of formula (2) may be prepared by reacting about 2 moles of hydroxycarboxylic acid and/or lactone with about 1 mole of diamine and about 2 moles of monoisocyanate.

When describing the reactant stoichiometry for preparing diamidediurethane of formula (3), it is necessary to keep in mind that each molecule of non-hydric carboxylic acid contains one carbonyl moiety, while each molecule of the anhydride thereof contains two carbonyl moieties. As the number of carbonyl moieties present in a reaction mixture is the important parameter in describing the reactant stoichiometry, it is convenient to express that stoichiometry in terms of moles of carbonyl moieties in the non-hydric carboxylic acid or anhydride thereof Thus, the reactant stoichiometry for preparing diamidediurethane of formula (3), expressed as moles of carbonyl moieties in the non-hydric carboxylic acid and/or anhydride thereof to moles of hydroxyamine to moles of diisocyanate should be about 2.5–1.5:2.5–1.5:1.5–0.5, is preferably about 2.2–1.8:2.2–1.8:1.2–0.8, is more preferably about 2.1–1.9:2.1–1.9:1.1:0.9, and is still more preferably about 2:2:1. Diamidediurethanes of formula (3) may be prepared by reacting about 2 moles of carbonyl moieties contributed by non-hydric carboxylic acid and/or anhydride with about 2 moles of hydroxyamine and about 1 mole of diisocyanate.

The order in which the reactants are mixed together is also important in preparing diamidediurethanes of the invention. Thus, the reactants are preferably combined in order that a hydroxyamide compound is prepared in a first step. Thus, the hydroxycarboxylic acid and/or lactone is preferably combined with the amine reactant, i.e., the monoamine in preparing a diamidediurethane of formula (1) or the diamine in preparing a diamidediurethane of formula (2), as the first step in the reaction sequence. The hydroxycarboxylic acid/lactone and the amine reactant are then heated so that the carbonyl moiety of the hydroxycarboxylic acid/lactone reacts with the amine moiety of the amine reactant, to form a hydroxyamide compound (which may be called a bishydroxybisamide compound when the amine reactant is diamine).

In preparing diamidediurethanes of formula (3), an intermediate hydroxyamide compound is prepared by reacting one mole of hydroxyamine for every mole of carbonyl contributed by the non-hydric carboxylic acid and anhydride thereof Of course, if anhydride is a reactant, then one mole of anhydride may react with two moles of hydroxyamine. In any event, the reactants are heated so that the carbonyl moiety of the non-hydric carboxylic acid or anhydride reacts with the amine moiety of the hydroxyamine, to form a hydroxyamide compound.

In order to maximize the formation of hydroxyamide compound, it is preferred that the carbonyl moiety of the hydroxycarboxylic acid/lactone or the non-hydric carboxylic acid/anhydride react exclusively, or at least preferentially, with the amine moiety of the amine reactant. The reaction between a carbonyl moiety and an amine moiety is termed amidification, while the reaction between a carbonyl moiety and a hydroxyl moiety is termed esterification. In other words, it is preferred that the hydroxyl moiety of the hydroxycarboxylic acid or hydroxyamine be relatively unreactive under reaction conditions that allow the amine moiety to react with the carbonyl moiety of the hydroxycarboxylic acid/lactone or the non-hydric carboxylic acid/anhydride. This selective reactivity is encouraged through judicious choice of the reaction parameters. For example, by selecting a hydroxycarboxylic acid or hydroxyamine with a sterically hindered hydroxyl moiety, the reactivity of the hydroxyl moiety is diminished. Thus, hydroxycarboxylic acids having secondary hydroxyl moieties and lactone prepared from the same, are preferred. By selecting a sterically non-hindered amine reactant, e.g., an amine reactant having only primary amine moieties, the amine moiety will have greater reactivity with a carbonyl moiety than if the reactant had a secondary amine moiety. Thus, hydroxyamines having primary amines are preferred.

Furthermore, formation of hydroxyamide compounds is favored at relatively lower reaction temperatures, because the amine moiety is kinetically more reactive with a carbonyl moiety than is a hydroxyl moiety. In other words, at higher temperatures, hydroxyl moieties and amine moieties are about equally reactive, and thus higher temperatures should be avoided. As another factor, the reaction time should be minimized, as longer reaction times provide further opportunity for the hydroxyl moiety to enter into reaction with a carbonyl moiety. In addition (or alternatively), steps may be taken to protect the hydroxyl moiety, i.e., convert it to a masked hydroxyl moiety which is no longer nucleophilic toward a carbonyl moiety, but which may be deprotected after the hydroxyamide compound is formed. While this is an effective means of ensuring that the hydroxyl moiety does not react with a carbonyl moiety, the introduction of a protecting moiety also introduces undesirable cost into the reaction.

Many hydroxyamide compounds are commercially available. For example, the amidification product of ethanolamine and stearic acid is commercially available under the trademark MONAMID S from Mona Industries, Inc., Paterson, N.J. 07544. The amidification product of ethanolamine and 12-hydroxystearic acid is commercially available under the trademark PARICIN 220 from CasChem, Inc., Bayonne, N.J. 07002. Such commercially available hydroxyamide compounds are suitable for use in the present invention.

After the hydroxyamide compound is formed or purchased, it may be reacted with the isocyanate reactant, i.e., diisocyanate when forming diamidediurethane of formulas (1) and (3), or monoisocyanate when forming diamidediurethane of formula (2). In this second step of the two-step sequence, the hydroxyl moiety of the hydroxyamide reactant preferably reacts with the isocyanate moiety of the isocyanate reactant, in favor of reaction with any other carbonyl moieties. Again, lower temperatures generally favor this desired reaction, and reduce undesired transamidification reactions. A relatively low temperature can be used in this step of the reaction, because isocyanate moieties are relatively reactive with hydroxyl moieties. As in the first step of the reaction sequence, shorter reaction times are preferred in order to minimize transamidification reactions.

Thus, to prepare a diamidediurethane of formula (1), a hydroxycarboxylic acid and/or lactone may be heated with a monoamine at about 100°–220° C. for about 2–6 hours, where vacuum may be applied during the reaction period in order to pull off water as it is formed, and thus drive the reaction to completion. The thus-formed hydroxyamide compound may then be reacted with diisocyanate at about 100°–160° C. to provide a diamidediurethane of formula (1). A reaction time of less than 2 hours is typically sufficient and a reaction time of 0.5–2 hours is preferred.

In one embodiment of the invention to prepare diamidediurethanes of formula (1), a relatively small amount of equal reactive equivalents of diamine and hydroxycarboxylic acid and/or lactone are added to the reaction mixture comprising monoamine and hydroxycarboxylic acid and/or lactone (where equivalents are based on carbonyl and amine moieties). In this way, a relatively small amount of bishydroxybisamide compound is formed along with the hydroxyamide compound formed from monoamine and hydroxycarboxylic acid and/or lactone. This provides some diol material (a compound having two hydroxyl groups) which can react with the diisocyanate that is used in the second step of the diamidediurethane synthetic sequence, and in this way a small amount of higher molecular weight material is formed along with the diamidediurethane. This higher molecular weight material may advantageously increase the melting point of the diamidediurethane composition, although too much of the higher molecular weight material may disadvantageously increase the melt viscosity of the diamidediurethane composition.

In general, when diamine is used as described above in the preparation of a composition comprising diamidediurethane of formula (1), then the total equivalents of amine (from monoamine and diamine) is approximately equal to the total equivalents of carbonyl (from hydroxycarboxylic acid and lactone). Thus, if diamine is added to an equal molar (equal equivalent) mixture of monoamine and hydroxycarboxylic acid and/or lactone, then additional hydroxycarboxylic acid and/or lactone should be added in an amount to provide carbonyl equivalents approximately equal the amine equivalents provided by the diamine. However, of the total equivalents of amine (monoamine and diamine) used to prepare a composition comprising a diamidediurethane of formula (1), the diamine preferably contributes no more than about 50%, more preferably no more than about 30%, and still more preferably no more than about 15% of that total.

The diamine useful in preparing compositions comprising diamidediurethane of formula (1) may be any of the diamines set forth above in connection with preparing diamidediurethane of formula (2), i.e., diamines of formula $H_2N-R^3-NH_2$.

In another embodiment of the invention to prepare compositions comprising diamidediurethane of formula (1), a relatively small amount of diol may be added to the reaction mixture comprising hydroxyamide and diisocyanate. As used herein, the term "diol" is intended to mean organic molecules having exactly two hydroxyl moieties. The diol reacts with the diisocyanate, to thereby prepare chain-extended diisocyanate. Thus, where the diol has the formula HO—$R^4$—OH, then the diisocyanate may have the formula OCN—$R^3$—NHC(O)O—$R^4$—OC(O)NH—$R^3$—NCO and/or OCN—$R^3$—NHC(O)O—$R^4$—OC(O)NH—$R^3$—NHC(O)O—$R^4$—OC(O)NH—$R^3$—NCO, etc. In other words, the diisocyanate may have the formula OCN—$R^3$—[NHC(O)O—$R^4$—OC(O)NH—$R^3$—]$_n$NCO wherein n ranges from zero to about 5. Alternatively, the diol may be reacted with the diisocyanate prior to reaction with the hydroxyamide.

As indicated by the generic diisocyanate structure above, the equivalents of diol are preferably less than the equivalents of diisocyanate. In this way, the formation of reactants having both isocyanate and hydroxyl moieties is reduced. In general, the equivalents of diol are much less than the equivalents of diisocyanate, so that the equivalent ratio of diol/diisocyanate is less than about ½, preferably less than about ⅓, and more preferably less than about ¼.

In this way, a small amount of moderately increased molecular weight diisocyanate is reacted with the hydroxyamide compound in the second step of the sequence to form a composition comprising diamidediurethane of formula (1). Thus, a small amount of higher molecular weight material is introduced into the composition comprising diamidediurethane of formula (1). This higher molecular weight (chain-extended) material may advantageously increase the melting point of the diamidediurethane composition, although too much of the higher molecular weight material may disadvantageously increase the melt viscosity of the diamidediurethane composition. The chain-extended isocyanate compound may also be used as the isocyanate compound in preparing diamidediurethane of formula (3).

The diol has the formula HO—$R^4$—OH, wherein $R^4$ is an organic moiety having two to about 50 carbon atoms, and optionally containing oxygen atoms. Thus, the diol may be aliphatic, such that $R^4$ is a $C_{2-50}$ straight-chain or branched-chain alkyl moiety. An exemplary aliphatic diol is neopentyl glycol, wherein $R^4$ is —$CH_2$—$C(CH_3)_2$—$CH_2$—. Another exemplary aliphatic diol is R-20LM, a low-molecular weight poly(butadiene)diol from Elf Atochem (Philadelphia, Pa.). Polyether diols, such as polyethylene glycols and polypropylene glycols, may also be used, where these diols are available from, e.g., Dow Chemical, Midland, Mich.

To prepare a diamidediurethane of formula (2), a hydroxycarboxylic acid and/or anhydride may be heated with a diamine at about 100°–220° C. for about 1–5 hours, where vacuum may be applied during the reaction period in order to pull off water as it is formed, and thus drive the reaction to completion. The thus-formed bishydroxybisamide may then be reacted with monoisocyanate at about 100°–160° C. for about 1–3 hours to provide a composition comprising diamidediurethane of formula (2).

To prepare a diamidediurethane of formula (3), a non-hydric carboxylic acid and/or lactone may be heated with a hydroxyamine at about 100°–220° C. for about 1–5 hours, with vacuum being applied during the reaction period in order to pull off water as it is formed, and thus drive the reaction to completion. The thus-formed hydroxyamide may be reacted with diisocyanate at about 100°–160° C. A reaction time of less than about 2 hours is typically sufficient, and a preferred reaction time is about 0.5 hours to about 2 hours.

As the diamidediurethane composition of the invention is preferably employed in a hot-melt ink composition, where volatile solvents are preferably not present, the preparation of the diamidediurethane composition preferably proceeds in the absence of volatile solvent. A small amount of an organic solvent may be added during the formation of the hydroxyamide compound, in order to assist in removing water from the reaction vessel. However, such an organic solvent is preferably removed after formation of the hydroxyamide compound. The progress of the reaction may be monitored by periodically pulling samples from the reacting mixture, and characterizing those samples by acid number and/or isocyanate number. The diamidediurethane preferably has an isocyanate number of essentially zero, i.e. there are essentially no unreacted isocyanate moieties present in the diamidediurethane composition.

Isocyanates can be detected by infrared using their strong absorption at 2,300–2,200 cm–1. For trace analysis, one can add excess amine and back titrate for unreacted amine using malachite green indicator. See L. B. Coyne in *Reaction Polymers*, W. Gum, W. Reise, and H. Ulrich editors, Hanser N.Y., 1992 p. 794.

The following examples are set forth as a means of illustrating the present invention and are not to be construed as a limitation thereon. In the following Examples, softening point was measured using a Mettler Dropping Point apparatus, with a heating rate of 1.5° C./min. Viscosity measurements were made using a Brookfield viscometer and are reported in centipoise (cP). 12-Hydroxystearic acid was CENWAX A™ (Union Camp Corporation, Wayne, N.J. stearylamine was ARMEEN 18D™ (Akzo Corporation triethylene glycol diamine was JEFFAMINE EDR148™ (Texaco Co., Houston, Tex.), poly(butadiene)diol was R-20LM™ (Elf Atochem, Philadelphia, Pa.) and all other chemicals were of standard grade as obtained from chemical supply houses such as Aldrich Chemical Co., Inc Milwaukee, Wis.

EXAMPLE 1

PREPARATION OF HEXANEDIISOCYANATE-MODIFIED STEARYL 12-HYDROXYSTEARAMIDE

Heating 260.3 g of 12-hydroxystearic acid with 245.9 g of stearylamine from 100° C. to 220° C. over 3 hours followe by application of a 15 millitorr vacuum for 2 hours yielded stearyl 12-hydroxystearamide as an off-white brittle wax with a softening point of 113° C., a melt viscosity of 10 cP at 130° C. Another batch of stearyl 12-hydroxystearamide, prepared in essentially the same manner, had a softening point of 106° C.

Heating 62.4 g of stearyl 12-hydroxystearamide with 9.2 g of 1,6-hexanediisocyanate to 150° C. over about 1 hour provided 1,6-hexanediisocyanate-modified stearyl 12-hydroxystearamide having a softening point of 99.9° C. and a melt viscosity of 50 cP at 130° C.

EXAMPLE 2

PREPARATION OF ISOPHORONE DIISOCYANATE-MODIFIED STEARYL 12-HYDROXYSTEARAMIDE

Heating 41.8 g of the stearyl 12-hydroxystearamide prepared in Example 1 with 8.2 g of isophoronediisocyanate to 150° C. over about 1 hour provided isophoronediisocyanate-modified stearyl 12-hydroxystearamide having a softening point of 106.1° C. and a melt viscosity of 72 cP at 130° C.

EXAMPLE 3

PREPARATION OF ISOPHORONE DIISOCYANATE-MODIFIED STEARYL 12-HYDROXYSTEARAMIDE

Heating 30.04 g of 12-hydroxystearic acid with 28.42 g of stearylamine from 21° C. to 218° C. over a 3 hour period yielded stearyl 12-hydroxystearamide having an acid number of 7. Heating the stearyl 12-hydroxystearamide wax with 21.99 g of isophorone diisocyanate from 21° C. to 150° C. over about 50 minutes provided isophorone diisocyanate-modified stearyl 12-hydroxystearamide having a melting point of 66.8° C. and a melt viscosity of 106 cP at 130° C.

EXAMPLES 4–6

PREPARATION OF 1,6-HEXANEDIISOCYANATE & POLY(BUTADIENE)DIOL-MODIFIED STEARYL 12-HYDROXYSTEARAMIDE

The stearyl 12-hydroxystearamide (12-HSA) prepared in Example 1 was heated to 130° C. with R-20LM, a low molecular weight poly(butadiene)diol, to blend these materials. The blend was then cooled to near room temperature and 1,6-hexanediisocyanate (HMDI) was added. This reaction mixture was then heated to 150° C. and held there under nitrogen for 1 hour followed by being poured out of the reaction flask. The amounts of each of the reactants, and selected properties of the products are set forth in TABLE 1.

TABLE 1

| EX-AMPLE NUMBER | COMPOSITION | PRODUCT LOOK/ FEEL | SOFTENING POINT (°C.) | VIS-COSITY @130° C. |
|---|---|---|---|---|
| 4 | 45.42 g 12-HAS 11.1 g R-20LM 7.5 g HMDI | Hazy-clear Sl. flex Sl. waxy | 95.5 | 86 cP |
| 5 | 39.7 g 12-HSA 16.7 g R-20LM 7.9 g HMDI | Clear, hard Sl. flex Sl. waxy | 98.4 | 160 cP |
| 6 | 34.0 g 12-HSA 22.2 g R-20LM 8.38 g HMDI | Clear, hard flexible | 100.8 | 570 cP |

EXAMPLES 7–8

PREPARATION OF ISOPHORONEDIISOCYANATE & NEOPENTYLGLYCOL-MODIFIED STEARYL 12-HYDROXYSTEARAMIDE

The stearyl 12-hydroxystearamide (12-HSA) prepared in Example 1 was heated with isophoronediisocyanate (IPDI) and neopentylglycol (NPG'ol) followed the procedure set forth for Examples 4–6 above, i.e., the NPG'ol and 12-HAS were melt blended, cooled, and reacted with the IPDI The amounts of each of the reactants, and selected properties of the products are set forth in Table 2.

TABLE 2

| EX-AMPLE NUMBER | COMPO-SITION | PRODUCT LOOK/ FEEL | SOFTENING POINT (°C.) | VISCOSITY @130° C. |
|---|---|---|---|---|
| 7 | 33.7 g 12-HSA 3.2 g NPG'ol 13.3 g IPDI | Sl. Haze Hard V. Brittle | 80.8 | 223 cP |
| 8 | 28.3 g 12-HSA 5.2 g NPG'ol 16.7 g IPDI | Clear Hard V. Brittle | 68.8 | 753 cP |

EXAMPLE 9

PREPAPATION OF ISOPHORONE DIISOCYANATE-MODIFIED STEARYL 12-HYDROXYSTEARAMIDE EXTENDED WITH ETHYLENE DIAMINE

Heating 100 parts (0.33 equivalents) 12-hydroxystearic acid with 64.1 parts (0.23 equivalents) stearylamine and 3.0 parts ethylenediamine (0.1 equivalents) to 220° C. yielded an extended stearyl 12-hydroxystearamide as a hard, opaque wax having an acid number of 7. Treatment of the extended stearyl 12-hydroxystearamde with 36.0 parts (0.33 equivalents) isophorone diisocyanate at 150° C. provided isophorone diisocyanate-modified stearyl 12-hydroxystearamide as a translucent, hard, light-tan solid having a melting point of 87° C. and a melt viscosity of 154 cP at 130° C.

EXAMPLE 10

PREPARATION OF HEXAMETHYLENE DIISOCYANATE-MODIFIED STEARYL 12-HYDROXYSTEARAMIDE EXTENDED WITH ETHYLENE DIAMINE

Heating 100 parts (0.33 equivalents) 12-hydroxystearic acid with 64.1 parts (0.23 equivalents) stearylamine and 3.0 parts ethylenediamine (0.1 equivalents) to 220° C. yielded an extended stearyl 12-hydroxystearamide as a hard, opaque wax having an acid number of 7. Treatment of the extended stearyl 12-hydroxystearamide with 27.2 parts (0.33 equivalents) hexamethylene diisocyanate at 150° C. provided hexamethylene diisocyanate-modified stearyl 12-hydroxystearamide as a translucent, hard, light-tan solid having a melting point of 94° C. and a melt viscosity of 110 cP at 130° C.

EXAMPLE 11

PREPARATION OF OCTADECYLISOCYANATE-MODIFIED BISAMIDE OF 12-HYDROXYSTEARIC ACID & 1,6-HEXANEDIAMINE

Heating 18.06 g of 12-hydroxystearic acid with 3.50 g of 1,6-hexanediamine for 2 hours at 220° C. yielded a bisamide wax. The bisamide wax was heated with 17.73 g of octadecylisocyanate for 1 hour at 150° C. to yield the titled product as a partially transparent resin having a melting point of 107.6° C. and a melt viscosity of 41 cP at 130° C.

EXAMPLE 12

PREPARATION OF OCTADECYLISOCYANATE-MODIFIED BISAMIDE OF 12-HYDROXYSTEARIC ACID & TRIETHYLENE GLYCOL DIAMINE

Heating 30.05 g of 12-hydroxystearic acid with 7.40 g of triethylene glycol diamine for 2.5 hours at 215° C. yielded a bisamide wax. The bisamide wax was treated with 29.52 g of octadecylisocyanate at 150° C. for 45 minutes to yield the titled product as a partially transparent resin, hard and non-tacky resin having a melting point of 92° C. and a melt viscosity of 28 cP at 130° C.

EXAMPLE 13

PREPARATION OF OCTADECYLISOCYANATE-MODIFIED BISAMIDE OF 12-HYDROXYSTEARIC ACID & 1,12-DIAMINO-DODECANE

Heating 19.57 g of 12-hydroxystearic acid with 6.51 g of 1,12-diamino-dodecane for 2.5 hours at 210° C. yielded a bisamide wax. The bisamide wax was heated with 19.25 g of octadecylisocyanate for 25 minutes at 147° C. to yield the titled product as a light-colored resin having a melt viscosity of 50 cP at 130° C. This material, even upon rapid cooling, tended to crystallize partially.

EXAMPLE 14

PREPARATION OF ISOPHORONEDIISOCYANATE-LINKED HYDROXYAMIDE

A 125 mL Erlenmeyer flask was charged with 37.45 g MONAMID ST™ (100 eq.% based on hydroxyls) and 12.57 g isophoronediisocyanate (100 eq.% based on isocyanates, i.e., the moles of hydroxyls equals the moles of isocyanates). This mixture was heated under a nitrogen atmosphere to 147° C., and held at that temperature for 15 minutes. The product, when cooled to room temperature, was a hard, translucent, waxy-like solid with a melting point of 89° C. and a melt viscosity of 105 cP at 130° C.

EXAMPLE 15

PREPARATION OF DIAMIDEDIURETHANE WITH CHAIN-EXTENDED AMIDE-URETHANE

A 125 mL Erlenmeyer flask was charged with 23.53 g MONAMID S™ (50 eq.% hydroxyls), 10.67 g PARICIN 220 (50 eq.% hydroxyls) and 15.81 g isophoronediisocyanate (100 eq.% isocyanates, i.e., the total moles of hydroxyl moieties equals the total moles of isocyanate moieties). This mixture was heated under a nitrogen atmosphere to 150° C., and held at that temperature for 20 minutes. This material, when cooled to room temperature, was a hard, nearly transparent solid with a melting point of 89° C. and a melt viscosity of 414 cP at 130° C.

It will be appreciated by those skilled in the art that changes could be made to the embodiments described above without departing from the broad inventive concept thereof It is understood, therefore, that this invention is not limited to the particular embodiments disclosed, but it is intended to cover modifications within the spirit and scope of the present invention as defined by the appended claims.

I claim:

1. A solventless composition having an isocyanate number of essentially zero, comprising at least one diamidediurethane having the following formulas (1), (2) and (3):

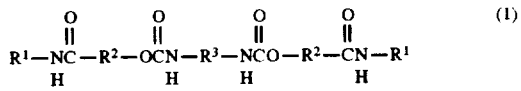

-continued

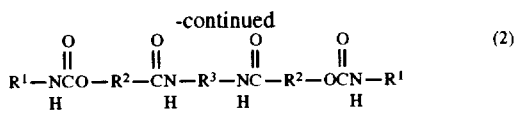

wherein each occurrence of $R^1$, $R^2$ and $R^3$ is independently selected from an organic moiety having the formula $C_{1-50}H_{2-102}O_{0-15}$, such that the composition has a melting point of about 40° C. to about 150° C. and a melt viscosity of less than about 300 centipoise when measured at 150° C.

2. The composition of claim 1 wherein the melting point is 80° C. to 130° C.

3. The composition of claim 2 wherein, independently at each occurrence, $R^1$ has from 6 to 36 carbon atoms, $R^2$ has from 2 to 36 carbon atoms and $R^3$ has from 2 to 36 carbon atoms.

4. The composition of claim 1 wherein the melt viscosity is less than 100 centipoise at 130° C.

5. The composition of claim 1 wherein each occurrence of $R^1$ is independently selected from $C_{6-36}$ hydrocarbon radical and each occurrence of $R^2$ is independently selected from a $C_{2-36}$ hydrocarbon diradical.

6. The composition of claim 5 wherein each occurrence of $R^1$ is independently selected from a linear, saturated $C_{8-22}$ hydrocarbon radical and each occurrence of $R^2$ is independently selected from a saturated $C_{2-24}$ hydrocarbon diradical.

7. The composition of claim 1 essentially free of any component having a boiling point of less than about 150° C.

8. The composition of claim 1 having an acid number of less than about 20.

9. The composition of claim 1 which is substantially non-tacky at room temperature.

10. The composition of claim 1 comprising the diamidediurethane of formula (1) and not the diamidediurethane of formulas (2) and (3).

11. The composition of claim 1 comprising the diamidediurethane of formula (2) but not the diamidediurethane of formulas (1) and (3).

12. The composition of claim 1 comprising the diamidediurethane of formula (3) but not the diamidediurethane of formulas (1) and (2).

13. The composition of claim 1 further comprising an image-forming component.

14. The composition of claim 13 wherein the image forming component is a colorant selected from pigment and dye.

15. The composition of claim 14 having a viscosity of less than about 50 centipoise at a temperature of about 75° C. to about 175° C.

16. The composition of claim 14 having a viscosity of to 40 centipoise at a temperature of 100° C. to 150° C.

17. The composition of claim 14 having a viscosity o about 5 centipoise to about 15 centipoise at a temperature o about 110° C. to about 130° C.

18. The composition of claim 14 having a melting poin and melt viscosity rendering it suitable for use as an ink i jet ink printing.

19. A method for preparing a diamidediurethane containing composition, comprising:

(a) forming a hydroxyamide compound having one eac or two each of a hydroxyl moiety and an amide moiet said hydroxyamide compound formed by reacting:
(i) a carbonyl moiety of a carbonyl compound selecte from compounds having, as their only reactiv moiety(s), one carboxylic acid moiety, one anhydride moiety, one lactone moiety, or one hydroxyl moiety and one carboxylic acid moiety, with (ii) an amine moiety of an amine compound selected from compounds having, as their only reactive moiety(s), one amine moiety (monoamine), two amine moieties (diamine), or one hydroxyl moiety and one amine moiety (hydroxyamine), to thereby form a hydroxyamide compound; and (b) reacting the hydroxyl moiety of the hydroxyamide compound with the isocyanate moiety of an isocyanate compound selected from compounds having, as their only reactive moieties, one isocyanate moiety (monoisocyanate) or two isocyanate moieties (diisocyanate), to thereby form diamidediurethane in a composition having an isocyanate number of essentially zero.

20. The method of claim 19 wherein step (a) is conducted under reaction conditions that favor amidification over esterification.

21. The method of claim 19 wherein step (b) is conducted in the substantial absence of solvent.

22. The method of claim 19 wherein the carbonyl compound is selected from a hydroxycarboxylic acid of the formula HO—R—COOH and the lactone thereof, the amine compound is a monoamine of formula $R^1$—$NH_2$ optionally in combination with a diamine of formula $H_2N$—$R^3$—$NH_2$, the isocyanate compound is a diisocyanate of formula OCN—$R^3$—NCO and diamidediurethane of formula (1) is prepared

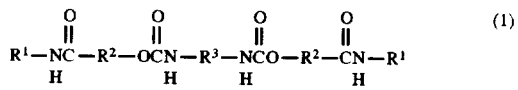

wherein each of $R^1$, $R^2$ and $R^3$ is independently selected from organic moieties having the formula $C_{1-50}H_{2-102}O_{0-15}$ such that said composition has a melting point of about 40° C. to about 150° C. and a melt viscosity of less than about 300 centipoise when measured at 150° C.

23. The method of claim 22 wherein, independently at each occurrence, $R^1$ is a linear, saturated $C_{6-36}$ hydrocarbon radical, $R^2$ is a $C_{4-36}$ hydrocarbon diradical, and $R^3$ is a $C_{2-36}$ hydrocarbon diradical.

24. The method of claim 22 wherein the carbonyl compound, monoamine and diisocyanate are reacted in a carbonyl compound:monoamine:diisocyanate molar ratio of 2.5–1.5:2.5–1.5:1.5–0.5 and diamine is not present in the reaction mixture.

25. The method of claim 24 wherein the molar ratio is 2.1–1.9:2.1–1.9:1.1–0.9.

26. The method of claim 22 wherein the carbonyl compound is 12-hydroxystearic acid.

27. The method of claim 22 wherein the total equivalents of amine moiety from monoamine and diamine are about equal to the total equivalents of carbonyl moiety from hydroxycarboxylic acid and lactone.

28. The method of claim 27 wherein the diamine is selected from ethylene diamine, 1,6-hexanediamine and dimer diamine.

29. The method of claim 22 wherein a diol compound of formula HO—$R^4$—OH is reacted with the diisocyanate either before or during reaction with the hydroxyamide compound, and $R^4$ is an organic moiety having the formula $C_{2-50}H_{4-102}O_{0-15}$.

30. The method of claim 29 wherein the diol compound is neopentyl glycol or poly(butadiene)diol.

31. The method of claim 19 wherein the carbonyl compound is a hydroxycarboxylic acid of the formula HO—$R^2$—COOH or is the lactone thereof, the amine compound is a diamine of formula $H_2N$—$R^3NH_2$, the isocyanate compound is a monoisocyanate of formula $R^1$—NCO and diamidediurethane of formula (2) is formed

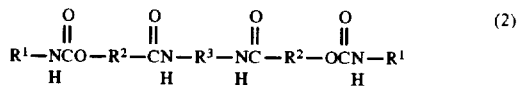

wherein each of $R^1$, $R^2$ and $R^3$ is independently selected from organic moieties having the formula $C_{1-50}H_{2-102}O_{0-15}$ such that said composition has a melting point of about 40° C. to about 150° C. and a melt viscosity of less than about 300 centipoise when measured at 150° C.

32. The method of claim 31 wherein, independently at each occurrence, $R^1$ is a $C_{6-36}$ hydrocarbon radical, $R^2$ is a $C_{4-36}$ hydrocarbon diradical and $R^3$ is a $C_{2-36}$ hydrocarbon diradical.

33. The method of claim 31 wherein the carbonyl compound, monoisocyanate and diamine are reacted in a carbonyl compound:monoisocyanate:diamine molar ratio of 2.5–1.5:2.5–1.5:1.5–0.5.

34. The method of claim 33 wherein the molar ratio is 2.1–1.9:2.1–1.9:1.1–0.9.

35. The method of claim 19 wherein the carbonyl compound is a nonhydric carboxylic acid of the formula $R^1$—COOH or is an anhydride thereof, the amine compound comprises an hydroxyamine of formula HO—$R^2$—$NH_2$, the isocyanate compound is a diisocyanate of formula OCN—$R^3$—NCO and diamidediurethane of formula (3) is prepared

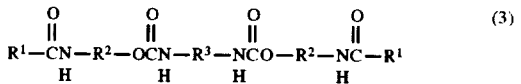

wherein each of $R^1$, $R^2$ and $R^3$ is independently selected from organic moieties having the formula $C_{1-50}H_{2-102}O_{0-15}$ such that said composition has a melting point of about 40° C. to about 150° C. and a melt viscosity of less than about 300 centipoise when measured at 150° C.

36. The method of claim 35 wherein, independently at each occurrence, $R^1$ is a $C_{6-36}$ hydrocarbon radical, $R^2$ is a $C_{2-36}$ hydrocarbon diradical and $R^3$ is a $C_{2-36}$ hydrocarbon diradical.

37. The method of claim 35 wherein the carbonyl compound, hydroxyamine and diisocyanate are reacted in a ratio of moles of carbonyl moieties in the non-hydric carboxylic acid and anhydride thereof to moles of hydroxyamine to moles of diisocyanate of 2.5–1.5:2.5–1.5:1.5–0.5.

38. The method of claim 37 wherein the ratio is 2.1–1.9:2.1–1.9:1.1–0.9.

39. The method of claim 35 wherein a diol compound of formula HO—$R^4$—OH is reacted with the diisocyanate either before or during reaction with the hydroxyamide compound, and $R^4$ is an organic moiety having the formula $C_{2-50}H_{4-102}O_{0-15}$.

40. The method of claim 39 wherein the diol compound is selected from neopentyl glycol and poly(butadiene)diol.

41. A composition having an isocyanate number of essentially zero made by the method of claim 19.

* * * * *